United States Patent [19]

Kanbe

[11] 4,096,086
[45] Jun. 20, 1978

[54] NEMATIC LIQUID CRYSTAL COMPOSITION

[75] Inventor: Sadao Kanbe, Suwa, Japan

[73] Assignee: Kabushiki Kaisha Suwa Seikosha, Tokyo, Japan

[21] Appl. No.: 643,884

[22] Filed: Dec. 23, 1975

[30] Foreign Application Priority Data

Dec. 23, 1974 Japan ................................. 50-2439
Dec. 25, 1974 Japan ................................. 50-4133
Dec. 26, 1974 Japan ................................. 50-711
Jan. 30, 1975 Japan ................................. 50-12748

[51] Int. Cl.² ........................... C09K 3/34; G02F 1/13
[52] U.S. Cl. .................................... 252/299; 58/23 R; 252/408; 350/350
[58] Field of Search ........................... 252/299, 408; 350/160 LC

[56] References Cited

U.S. PATENT DOCUMENTS

| 3,876,286 | 4/1975 | Deutscher et al. | 252/299 |
|---|---|---|---|
| 3,923,857 | 12/1975 | Boller et al. | 252/299 |
| 3,947,375 | 3/1976 | Gray et al. | 252/299 |
| 3,975,286 | 8/1976 | Oh | 252/299 |
| 3,981,817 | 9/1976 | Boller et al. | 252/299 |
| 3,984,344 | 10/1976 | Cole, Jr. | 252/299 |
| 4,000,084 | 12/1976 | Hsieh et al. | 252/299 |
| 4,001,137 | 1/1977 | Steinstrasser | 252/299 |

FOREIGN PATENT DOCUMENTS

| 2,139,628 | 2/1973 | Germany | 252/299 |
|---|---|---|---|
| 2,415,929 | 10/1974 | Germany | 252/299 |
| 2,321,632 | 11/1974 | Germany | 252/299 |
| 2,456,083 | 6/1975 | Germany | 252/299 |
| 2,502,904 | 7/1975 | Germany | 252/299 |
| 2,538,865 | 3/1976 | Germany | 252/299 |
| 4,934,488 | 3/1974 | Japan | 252/299 |
| 49-38,888 | 4/1974 | Japan | 252/299 |
| 4,988,791 | 8/1974 | Japan | 252/299 |
| 5,023,385 | 3/1975 | Japan | 252/299 |

Primary Examiner—Benjamin R. Padgett
Assistant Examiner—T. S. Gron
Attorney, Agent, or Firm—Blum, Moscovitz, Friedman & Kaplan

[57] ABSTRACT

Nematic liquid crystal compositions consisting of compounds having high stability with respect to moisture-resistance, oxidation-resistance and light-resistance, complete transparency and a wide range of operating temperatures are disclosed. The compositions are particularly useful for incorporation in a display device in a timepiece, and, more particularly, in a wristwatch. The compounds are mostly of the type wherein two benzene rings are joined by an ester group.

8 Claims, 6 Drawing Figures

NEMATIC LIQUID CRYSTAL COMPOSITION

BACKGROUND OF THE INVENTION

In order to meet competition, it is necessary that display devices operate with materials which can be driven by a low voltage and which are very low in cost. Liquid crystals are very promising as display materials for subject devices since they can be driven with low voltages and, especially, in the field-effect type of devices, consume virtually no power, since the current drawn is almost zero. As a result, a number of liquid crystal devices have already been developed and used.

The liquid crystal materials are all organic compounds. While most compounds have two transition points at which they go, respectively, from a solid to a liquid and from a liquid to a vapor, liquid crystal materials have three transition points; in other words, they can exist in four different states. As the temperature is raised, liquid crystals which are initially in the solid state go to the liquid crystal state in which they show the ordering of crystals but flow as readily as true liquids. As the temperature is raised a clearing point is reached. Above this temperature the molecules have enough energy so that the ordered state is completely destroyed and the material now becomes a true liquid. Then, as with ordinary compounds, as the temperature is raised the liquid eventually becomes a vapor.

As to liquid crystal materials in the mesomorphic phase, that is, between the melting point an the clearing point, the liquid crystals fall into three classes, namely smectic, nematic and cholesteric. Liquid crystal materials used in display cells at the present time are all of the nematic type; the nematic liquid crystals can further be subdivided into those which function by the light scattering mode and those which depend on the field effect. The present invention relates to liquid crystal compositions used in display cells depending on the field effect.

A large number of types of nematic liquid crystal materials and compositions have already been discovered. Conventional liquid crystal materials, however, suffer from a number of defects summarized as follows:

1. A common colorless liquid crystal material is that known as the Schiff base. The grouping characteristic of the Schiff base is positioned in the center of the molecule, namely, between two benzene groups which are substituted in the para position. This type of material is very difficult to protect from decomposition because it is subject to attack both by moisture and by oxygen.

2. Liquid crystal materials having an azoxy group between the two benzene rings are relatively stable so far as moisture and oxygen are concerned. However, compounds of the azoxy type absorb light in the visible range. This light degrades them, and moreover, these compounds are colored. Consequently, in order to protect them it is necessary to use a colored filter so that the whole display portion of the cell is colored. The color must be suitable to the overall design of the timepiece or other articles in which the display cell is to be used, and, furthermore, the display contrast is weakened so that it is more difficult to discern the display at low light levels.

3. Liquid crystal compounds having the ester group between the benzene rings (hereinafter referred to as ester liquid crystals) are free from the disadvantages mentioned above. However, in general, the ester liquid crystals known to date are operable over so narrow a temperature range that they cannot be widely used. For example, a liquid crystal composition having the general formula

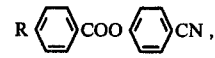

in which R is a linear-chain alkyl group is typical of such compounds. However, when used alone, or when a mixture of compounds having this formula are used, the composition has the deficiency that the clearing point (hereinafter referred to as CP) at which the composition becomes a pure liquid is below 50° C, this temperature limit being unsuitably low for many applications.

Further, compositions consisting of ester liquid crystals having the general formula of

in which R and R' are normal alkyl groups, in combination with one or more liquid crystal compounds having the general formula

also have been considered. However, the CP of such compositions is also below 50° C so that compositions containing at least one of each type of material described do not meet the requirements. Another disadvantage of this type of composition from which the Schiff base types and the azoxy types do not suffer is that on chilling they do not remain in the super-cooled state for a substantial period of time, so that it is difficult to use such compositions in regions where the temperature can drop below, for instance, 0° C.

4. Another type of liquid crystal material which has been tried in combination with the nitrile described above is that represented by the general formula

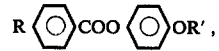

where R and R' are normal alkyl groups. However, the CP of the compositions was still below 50° C.

5. In a further attempt to raise the CP, ester liquid crystals were tested in combination with the nitriles where the liquid crystals were substituted in the para position of one of the benzene rings with an acyl group, the liquid crystal material having the general formula

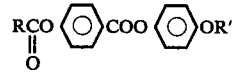

R and R' again being normal alkyl groups.

Also, compounds of the type

were tested in combination with nitriles. Both of these types of compounds raised the CP of the composition above 50° C as desired. However, on a life-test it was found that the ester or carbonate group at the end of the molecule interfered with the orientation of the molecules so that these compounds were unsuitable for use in field-effect display cells.

As is evident, then, it would be desirable to be able to provide liquid crystal composition which operate at a low voltage, are colorless, and are stable against moisture, oxygen and light. In addition, the liquid crystal materials must be nematic and suitable for use in field-effect display cells. Most important, a wider operating temperature range is needed.

SUMMARY OF THE INVENTION

Nematic liquid crystal compositions suitable for use in a field-effect display device, and particularly where the display device is in a timepiece such as a wristwatch, include a nitrile having the general formula

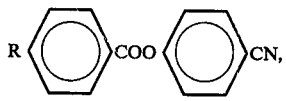

and at least one compound of at least two types of compounds selected from the compounds having the following general formulas:

In all cases, R and R' represent straight-chain alkyl groups.

In the nitrile compound, R may have from 3 to 9 carbon atoms. In the first of the three compounds tabulated above, R and R' may have from 1 to 9 carbon atoms; in the second of the three compounds tabulated R and R' may have from 1 to 9 carbon atoms; and in the third of the three compounds tabulated R and R' may have from 4 to 9 carbon atoms.

The above compounds, as aforenoted, are useful in field-effect display cells such as are used in timepieces, and, in particular, in wristwatches. Naturally, they are used in connection with a battery and electronic circuitry for driving the timepiece and activating the display cell.

Accordingly, an object of the present invention is a liquid crystal composition suitable for use in field-effect display cells said composition being transparent, colorless, resistant to the effects of moisture, oxygen and light and having an operating temperature range which extends below 0° C and above 50° C.

A further object of the present invention is a nematic liquid crystal composition suitable for use in a display cell operating by means of the field-effect where all or all but one or two of the compounds of said composition include an ester group between two benzene rings substituted in the para position.

Another object of the present invention is a timepiece including a display cell having therein a nematic liquid crystal composition as aforenoted, electronic timekeeping circuitry and circuitry for driving said display cell in a battery for powering the timepiece and its circuitry.

Still other objects and advantages of the invention will in part be obvious and will in part be apparent from the specification.

The invention accordingly comprises a composition of matter possessing the characteristics, properties, and the relation of components which will be exemplified in the composition hereinafter described, and an article including said composition of matter, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The compositions of subject invention consist mostly of liquid crystal materials in each of which has a structure including two benzene rings joined by an ester group and substituted in the para position. Moreover, each composition includes at least one compound having the following general formula:

 (I), in which R is a straight-chain alkyl group having 3 to 9 carbons.

In a first embodiment of the invention compounds of type (I) are combined with compounds of types (II) and (III) as follows:

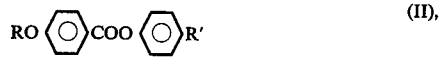 (II), wherein R and R' are straight-chain alkyl groups having from 1 to 9 carbon atoms.

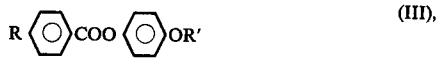 (III), in which R and R' are straight-chain alkyl groups having from 3 to 9 carbon atoms.

Table I shows compounds of the three types to be combined for the preparation of compositions having the desired properties of stability, high transparency and a wide operating temperature range.

TABLE 1

| Structural Formula | Name of Compound | Temperature Characteristic (° C) |
| --- | --- | --- |
| $C_4H_9$–⟨O⟩–COO–⟨O⟩–CN | P-cyanophenyl-P'-n-butylbenzoate | C →66→ I ↘ ↗42 N |
| $C_5H_{11}$–⟨O⟩–COO–⟨O⟩–CN | P-cyanophenyl-P'-n-amylbenzoate | C →63→ I ↘ ↗56 N |
| $C_6H_{13}$–⟨O⟩–COO–⟨O⟩–CN | P-cyanophenyl-P'-n-hexylbenzoate | C —41.5— N —45.5— I |
| $C_7H_{15}$–⟨O⟩–COO–⟨O⟩–CN | P-cyanophenyl-P'-n-heptylbenzoate | C —44— N —56.5— I |
| $C_8H_{17}$–⟨O⟩–COO–⟨O⟩–CN | P-cyanophenyl-P'-n-octylbenzoate | C —46— N —53.5— I |
| $C_5H_{11}$–⟨O⟩–COO–⟨O⟩–$OC_6H_{13}$ | P-n-hexyloxyphenyl-P'-n-amylbenzoate | C —40— N —59— I |
| $C_6H_{13}O$–⟨O⟩–COO–⟨O⟩–$C_7H_{15}$ | P-n-heptylphenyl-P'-n-hexyloxybenzoate | C —43— N —63— I |

Note: C = crystalline; N = nematic liquid crystal and I = isotropic.

Following is a specimen composition including 5 compounds of type (I) and one compound each of types (II) and (III):

EMBODIMENT 1

| Structural formula | Name of Compound | Weight % |
| --- | --- | --- |
| $C_4H_9$–⟨O⟩–COO–⟨O⟩–CN | P-cyanophenyl-P'-n-butylbenzoate | 6 |
| $C_5H_{11}$–⟨O⟩–COO–⟨O⟩–CN | P-cyanophenyl-P'-n-amylbenzoate | 11 |
| $C_6H_{13}$–⟨O⟩–COO–⟨O⟩–CN | P-cyanophenyl-P'-n-hexylbenzoate | 16 |
| $C_7H_{15}$–⟨O⟩–COO–⟨O⟩–CN | P-cyanophenyl-P'-n-heptylbenzoate | 15 |
| $C_8H_{17}$–⟨O⟩–COO–⟨O⟩–CN | P-cyanophenyl-P'-n-octylbenzoate | 20 |
| $C_5H_{11}$–⟨O⟩–COO–⟨O⟩–$OC_6H_{13}$ | P-n-hexyloxyphenyl-P'-n-amylbenzoate | 16 |
| $C_6H_{13}O$–⟨O⟩–COO–⟨O⟩–$C_7H_{15}$ | P-n-heptylphenyl-P'-n-hexyloxybenzoate | 16 | melting point of Embodiment 1 is −7° C and the clearing point is 54° C. The composition resists crystallization at −15° C for at least 12 hours.

Figure 1:
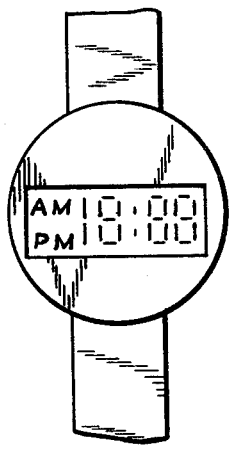
FIG. 1 is a watch having therein a display cell including a composition in accordance with the present invention.
Figure 2:
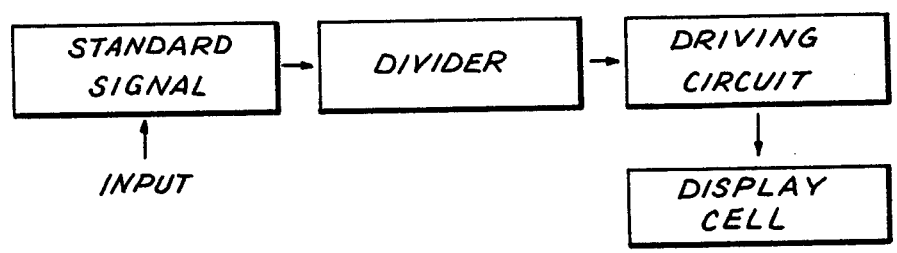
FIG. 2 is a schematic diagram of the circuitry for activating a display cell.
Figure 3:
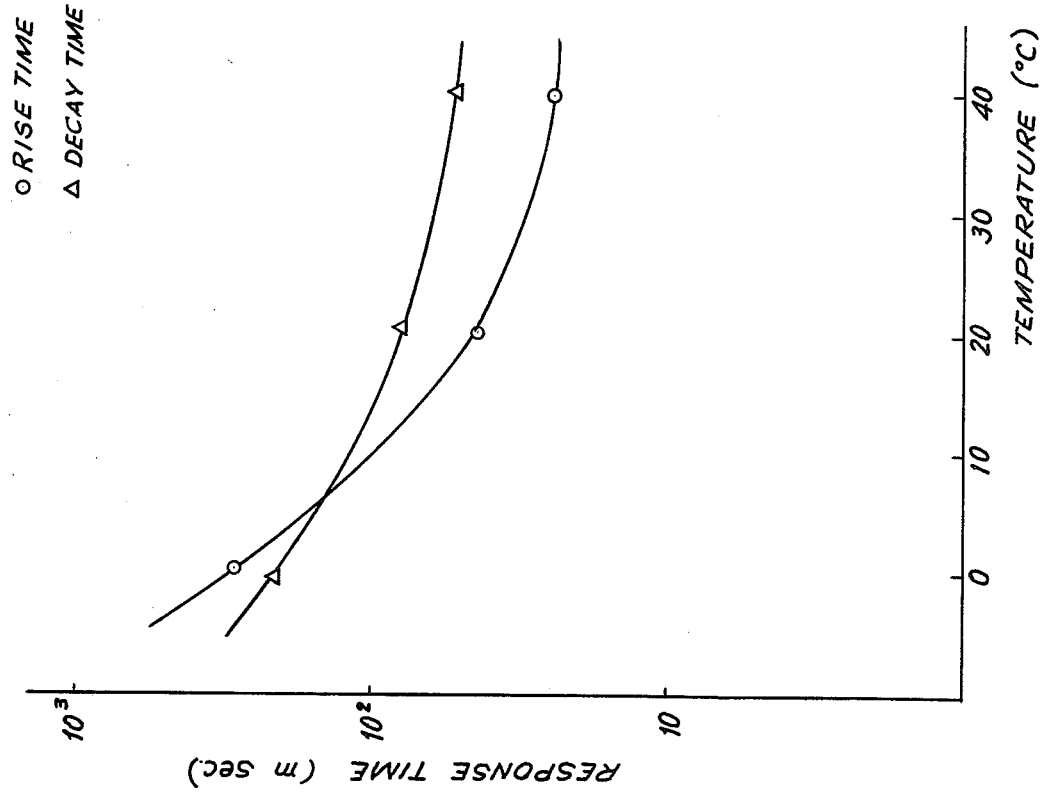
FIG. 3 is a graph of the rise time and decay time for liquid crystal compositions in accordance with the present invention as a function of temperature.

A wristwatch suitable for using the above compositions is shown schematically in FIG. 1; a block diagram of the circuitry of such a wristwatch is shown in a schematic view in FIG. 2. In a timepiece, in addition to the matters of life and contrast, the speed of response is also important. The response speed as a function of temperature is shown in FIG. 3.

Figure 4:
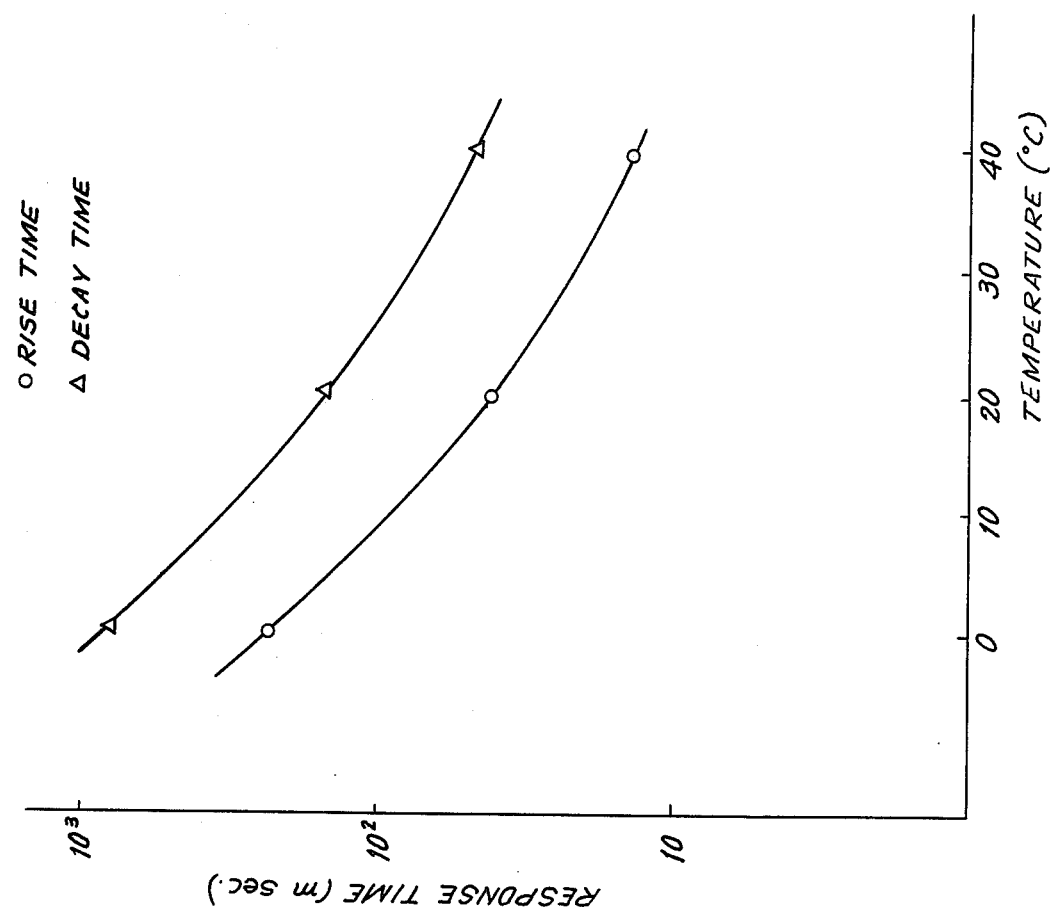
FIG. 4 is a graph of the rise time and decay time of Schiff-base liquid crystal compositions as a function of temperature.
Figure 5:
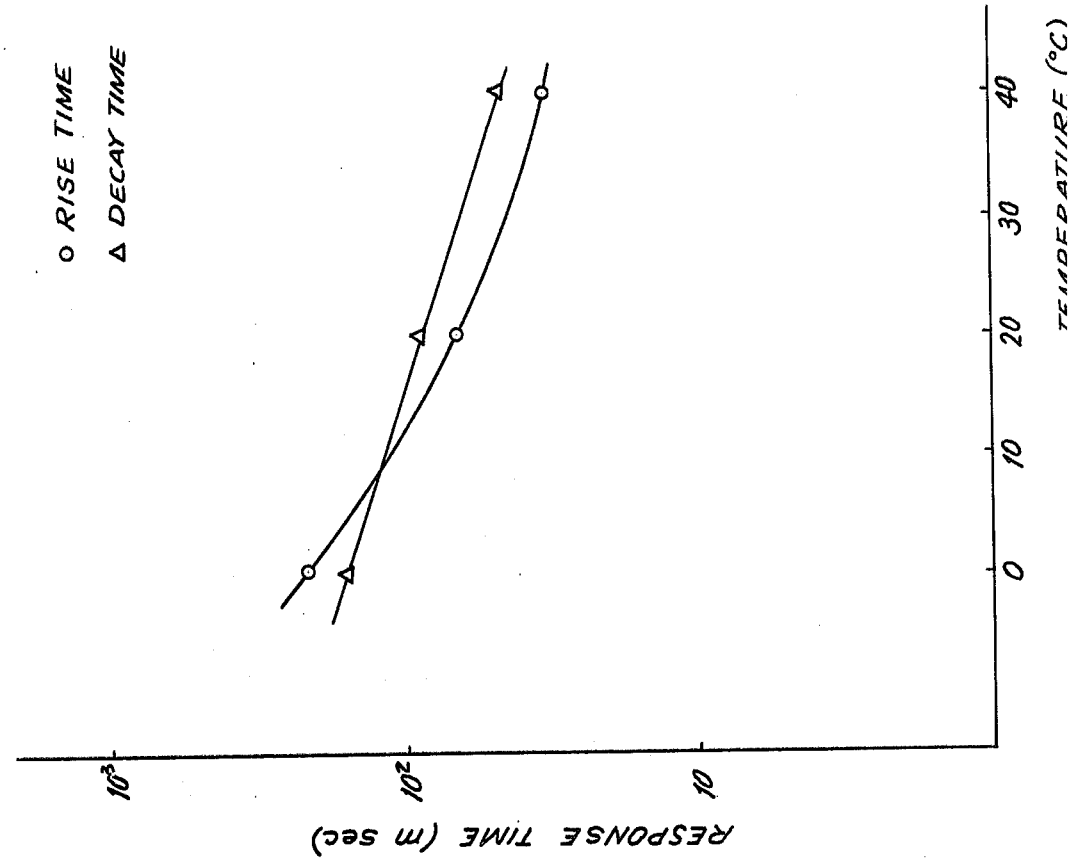
FIG. 5 is a graph of the rise time and decay of azoxy liquid crystal compositions as a function of temperature.

It has been thought that the response speed of the ester liquid crystal is low because of its high viscosity. Moreover, tests on conventional ester liquid crystal compositions have given results which support this view. However, the response speeds of the liquid crystal compositions according to the present invention are much greater than those of the conventional ester liquid crystal compositions; in addition, they are also greater than those of the Schiff-base liquid crystals, and are about the same as those of conventional azoxy group liquid crystals. The relationships between the response speed and the temperature for the Schiff liquid crystals and the azoxy group liquid crystals are shown respectively in FIGS. 4 and 5. The high response speed of the compositions of the present invention make them especially suitable for display cells in wristwatches.

In a second embodiment of the present invention, at least one compound of each of types (I) and (II) are used in combination with at least one compound having the following general formula:

(IV)

where R and R' are straight-chain alkyl groups having from 3 to 9 carbon atoms. A sample compound of type (IV) is the following:

| Structural formula | Name of Compound | Temperature characteristics, °C |
|---|---|---|
| C₅H₁₁O–⟨O⟩–COO–⟨O⟩–OC₈H₁₇ | P-n-octyloxyphenyl-P'-n-amyloxybenzoate | C —49— N —83— I |

Following is a composition including five compounds of type (I), one compound of type (II) and one compound of type (IV):

EMBODIMENT 2

| Structural formula | Name of Compounds | Weight % |
|---|---|---|
| C₄H₉–⟨O⟩–COO–⟨O⟩–CN | P-cyanophenyl-P'-n-butylbenzoate | 5 |
| C₅H₁₁–⟨O⟩–COO–⟨O⟩–CN | P-cyanophenyl-P'-n-amylbenzoate | 11 |
| C₆H₁₃–⟨O⟩–COO–⟨O⟩–CN | P-cyanophenyl-P'-n-hexylbenzoate | 18 |
| C₇H₁₅–⟨O⟩–COO–⟨O⟩–CN | P-cyanophenyl-P'-n-heptylbenzoate | 18 |
| C₈H₁₇–⟨O⟩–COO–⟨O⟩–CN | P-cyanophenyl-P'-n-octylbenzoate | 19 |
| C₆H₁₃O–⟨O⟩–COO–⟨O⟩–C₇H₁₅ | P-n-heptylphenyl-P'-n-hexyloxybenzoate | 19 |
| C₅H₁₁O–⟨O⟩–COO–⟨O⟩–OC₈H₁₇ | P-n-octyloxyphenyl-P'-n-amyloxybenzoate | 10 |

The melting point of the composition is −3° C and the clearing point is 55° C. In a super-cooling test, it was found that the liquid crystal composition did not crystallize after 15 hours at −15° C.

Suitable liquid crystal compositions can also be prepared from compounds of types (I), (III) and (IV). However, in selecting compounds of type (IV), the number of carbon atoms in the groups R and R' is 4 to 9.

Embodiment 3 has the following composition:

| Structural formula | Name of Compound | Weight % |
|---|---|---|
| C₄H₉–⟨O⟩–COO–⟨O⟩–CN | P-cyanophenyl-P'-n-butylbenzoate | 7 |
| C₅H₁₁–⟨O⟩–COO–⟨O⟩–CN | P-cyanophenyl-P'-n-amylbenzoate | 11 |
| C₆H₁₃–⟨O⟩–COO–⟨O⟩–CN | P-cyanophenyl-P'-n-hexylbenzoate | 19 |
| C₇H₁₅–⟨O⟩–COO–⟨O⟩–CN | P-cyanophenyl-P'-n-heptylbenzoate | 17 |
| C₈H₁₇–⟨O⟩–COO–⟨O⟩–CN | P-cyanophenyl-P'-n-octylbenzoate | 22 |
| C₅H₁₁–⟨O⟩–COO–⟨O⟩–OC₆H₁₃ | P-n-hexyloxyphenyl-P'-n-amylbenzoate | 17 |
| C₅H₁₁O–⟨O⟩–COO–⟨O⟩–OC₈H₁₇ | P-n-octyloxyphenyl-P'-n-amyloxybenzoate | 7 |

The melting point of Embodiment 3 is −4° C and the clearing point is 53.5° C. Moreover, in a super-cooling test, the liquid fails to crystallize after 15 hours at −15° C.

Suitable compositions can also be made using all four types of liquid crystals. Again as with Embodiment 3, the R and R' groups of type IV compounds are limited to 4 to 9 carbon atoms.

Following is the composition of Embodiment 4:

| Structural formula | Name of Compound | Weight % |
|---|---|---|
| C₄H₉–⟨O⟩–COO–⟨O⟩–CN | P-cyanophenyl-P'-n-butylbenzoate | 10 |

| Structural formula | Name of Compound | Weight % |
|---|---|---|
| $C_5H_{11}$-⟨○⟩-COO-⟨○⟩-CN | P-cyanophenyl-P'-n-amylbenzoate | 14 |
| $C_7H_{15}$-⟨○⟩-COO-⟨○⟩-CN | P-cyanophenyl-P'-n-heptylbenzoate | 22 |
| $C_8H_{17}$-⟨○⟩-COO-⟨○⟩-CN | P-cyanophenyl-P'-n-octylbenzoate | 24 |
| $C_5H_{11}$-⟨○⟩-COO-⟨○⟩-$OC_6H_{13}$ | P-n-hexyloxyphenyl-P'-n-amylbenzoate | 10 |
| $C_6H_{13}O$-⟨○⟩-COO-⟨○⟩-$C_7H_{15}$ | P-n-heptylphenyl-P'-n-hexyloxybenzoate | 10 |
| $C_6H_{13}O$-⟨○⟩-COO-⟨○⟩-$OC_8H_{17}$ | P-n-octyloxyphenyl-P'-n-hexyloxybenzoate | 10 |

The melting point of Embodiment 4 is −6° C and the clearing point is 57° C. On the usual super-cooling test, the material remained liquid after more than 15 hours at −15° C.

Figure 6:
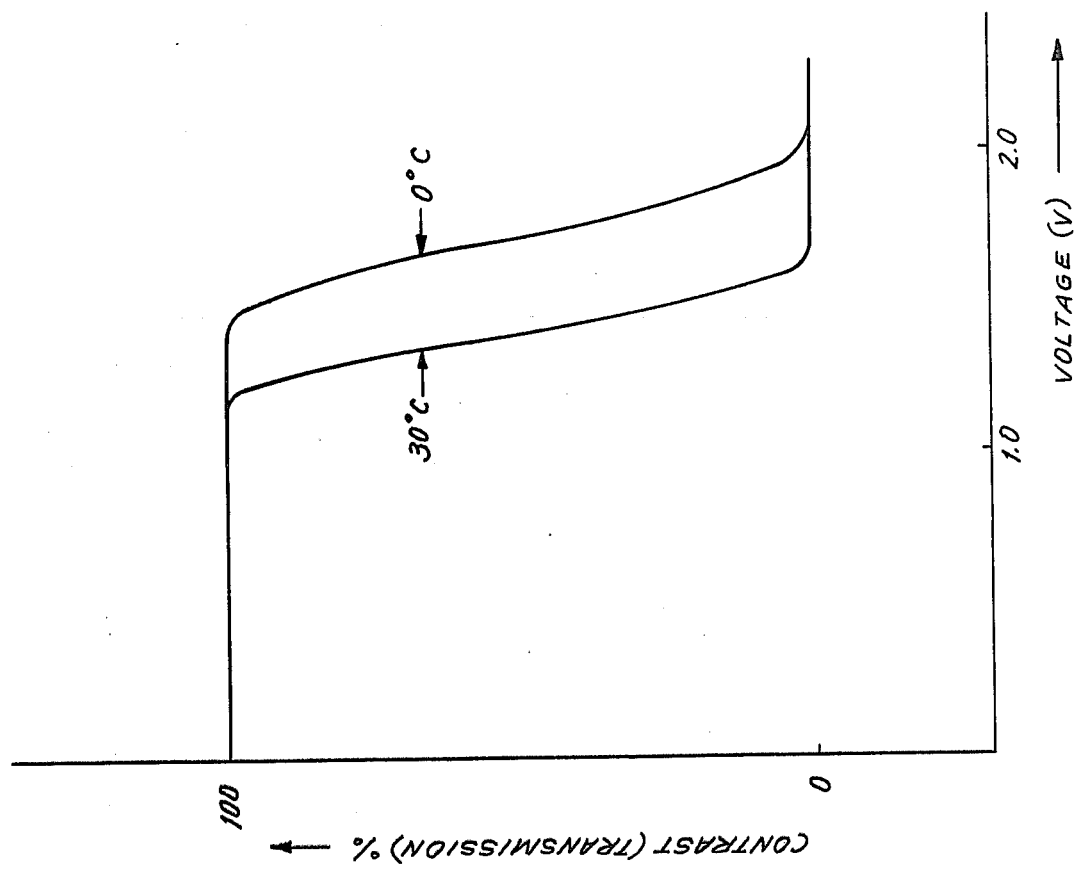
FIG. 6 is a graph of contrast versus applied voltage for two different temperatures, namely 0° C and 30° C.

This composition was tested in order to determine the light transmission as a function of voltage when used in a typical display device depending on the field effect. FIG. 6 shows a curve of transmission versus electric field. The value of 100% at 0 field is the transmission at that field. The value of the transmission indicated as 0% is that corresponding to saturation, namely, the value which remains unchanged when the applied voltage is increased. The graphs represent experimental data taken at 30° C and at 0° C, and, as can be seen, the shift caused by this change in temperature is only 0.4 V which is considered to be very small. In contrast, conventional ester liquid crystal materials give shifts from 1 to 2 V. As a result of the fact that the shift is so small for compositions in accordance with the present invention, circuit design is rendered relatively simple.

Embodiment 5 is a composition which includes all four types of ester liquid crystal compounds and a biphenyl liquid crystal material.

| Structural formula | Name of compounds | Weight % |
|---|---|---|
| $C_7H_{15}$-⟨○⟩-⟨○⟩-CN | P-n-heptyl-P'-cyano-biphenyl | 10 |
| $C_5H_{11}$-⟨○⟩-COO-⟨○⟩-CN | P-cyanophenyl-P'-n-amylbenzoate | 14 |
| $C_7H_{15}$-⟨○⟩-COO-⟨○⟩-CN | P-cyanophenyl-P'-n-heptylbenzoate | 22 |
| $C_8H_{17}$-⟨○⟩-COO-⟨○⟩-CN | P-cyanophenyl-P'-n-octylbenzoate | 24 |
| $C_5H_{11}$-⟨○⟩-COO-⟨○⟩-$OC_6H_{13}$ | P-n-hexyloxyphenyl-P'-n-amylbenzoate | 10 |
| $C_6H_{13}O$-⟨○⟩-COO-⟨○⟩-$C_7H_{15}$ | P-n-heptylphenyl-P'-n-hexyloxybenzoate | 10 |
| $C_6H_{13}O$-⟨○⟩-COO-⟨○⟩-$OC_8H_{17}$ | P-n-octyloxyphenyl-P'-n-hexyloxybenzoate | 10 |

Embodiment 5 melts at −7° C and has a clearing point of 56° C.

Embodiment 6 is prepared by adding 1 weight % of P-methoxyphenol

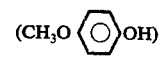

($CH_3O$-⟨○⟩-OH)

to the liquid crystal composition of embodiment 4.

The addition of the biphenyl and the methoxyphenol to the ester liquid crystal compounds has the objective of depressing the freezing point and delaying crystallization at low temperature.

The compositions of the present invention, in general are suitable for use in the northern regions of the north hemisphere and the southern regions of the southern hemisphere as a result of the fact that the crystallization point is substantially below the freezing temperature and also because of the fact that recrystallization is delayed, the compositions super-cooling substantially.

It will thus be seen that the objects set forth above among those made apparent from the preceding description, are efficiently attained and, since certain changes may be made in the above composition of matter and in the article including said composition of matter, without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A nematic liquid crystal composition of net positive dielectric anisotropy having a wide temperature range of operation and suitable for use in display cells consisting apart from minor impurities and additions of 68 to 76 weight percent of at least one compound having the general formula

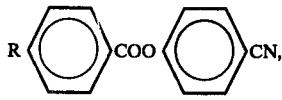

indicated by the character (I), where R is an n-alkyl group having 3 to 9 carbon atoms; and at least one compound from each of at least two types of compounds selected from the three types of compounds having respectively, the formulas

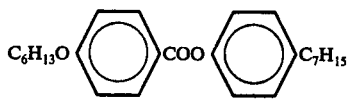

indicated by the character, (II),

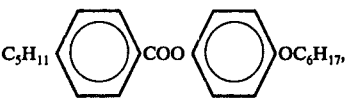

indicated by the character (III) and

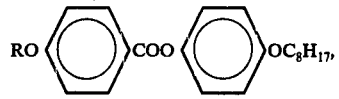

indicated by the character (IV), where R is an n-alkyl group having 5 to 6 carbon atoms.

2. A nematic liquid crystal composition of net positive dielectric anisotropy having a wide temperature range of operation and suitable for use in display cells, wherein said composition consists essentially, apart from minor impurities, of

| | | |
|---|---|---|
| $C_4H_9$–⟨O⟩–COO–⟨O⟩–CN | P-cyanophenyl-P'-n-butylbenzoate | 6 wt. % |
| $C_5H_{11}$–⟨O⟩–COO–⟨O⟩–CN | P-cyanophenyl-P'-n-amylbenzoate | 11 wt. % |
| $C_6H_{13}$–⟨O⟩–COO–⟨O⟩–CN | P-cyanophenyl-P'-n-hexylbenzoate | 16 wt. % |
| $C_7H_{15}$–⟨O⟩–COO–⟨O⟩–CN | P-cyanophenyl-P'-n-heptylbenzoate | 15 wt. % |
| $C_8H_{17}$–⟨O⟩–COO–⟨O⟩–CN | P-cyanophenyl-P'-n-octylbenzoate | 20 wt. % |
| $C_5H_{11}$–⟨O⟩–COO–⟨O⟩–$OC_6H_{13}$ | P-n-hexyloxyphenyl-P'-n-amylbenzoate | 16 wt. % |
| $C_6H_{13}O$–⟨O⟩–COO–⟨O⟩–$C_7H_{15}$ | P-n-heptylphenyl-P'-n-hexyloxybenzoate | 16 wt. % | said composition having a melting point below 0° C and a clearing point above 50° C.

3. A nematic liquid crystal composition of net positive dielectric anisotropy having a wide temperature range of operation and suitable for use in display cells, wherein said composition consists essentially, apart from minor impurities, of

| | | |
|---|---|---|
| $C_4H_9$–⟨O⟩–COO–⟨O⟩–CN | P-cyanophenyl-P'-n-butylbenzoate | 5 wt.% |
| $C_5H_{11}$–⟨O⟩–COO–⟨O⟩–CN | P-cyanophenyl-P'-n-amylbenzoate | 11 wt. % |
| $C_6H_{13}$–⟨O⟩–COO–⟨O⟩–CN | P-cyanophenyl-P'-n-hexylbenzoate | 18 wt. % |
| $C_7H_{15}$–⟨O⟩–COO–⟨O⟩–CN | P-cyanophenyl-P'-n-heptylbenzoate | 18 wt. % |
| $C_8H_{17}$–⟨O⟩–COO–⟨O⟩–CN | P-cyanophenyl-P'-n-octylbenzoate | 19 wt. % |
| $C_6H_{13}O$–⟨O⟩–COO–⟨O⟩–$C_7H_{15}$ | P-n-heptylphenyl-P'-n-hexyloxybenzoate | 19 wt. % |
| $C_5H_{11}O$–⟨O⟩–COO–⟨O⟩–$OC_8H_{17}$ | P-n-octyloxyphenyl-P'-n-amyloxybenzoate | 10 wt. % | said composition having a melting point below −3° C and a clearing point above 55° C.

4. A nematic liquid crystal composition of net positive dielectric anisotropy having a wide temperature range of operation and suitable for use in display cells, wherein said composition consists essentially, apart from minor impurities, of

| Structure | Name | Amount |
|---|---|---|
| $C_4H_9$-⟨O⟩-COO-⟨O⟩-CN | P-cyanophenyl-P'-n-butylbenzoate | 7 wt. % |
| $C_5H_{11}$-⟨O⟩-COO-⟨O⟩-CN | P-cyanophenyl-P'-n-amylbenzoate | 11 wt. % |
| $C_6H_{13}$-⟨O⟩-COO-⟨O⟩-CN | P-cyanophenyl-P'-n-hexylbenzoate | 19 wt. % |
| $C_7H_{15}$-⟨O⟩-COO-⟨O⟩-CN | P-cyanophenyl-P'-n-heptylbenzoate | 17 wt. % |
| $C_8H_{17}$-⟨O⟩-COO-⟨O⟩-CN | P-cyanophenyo-P'-n-ocyylbenzoate | 22 wt. % |
| $C_5H_{11}$-⟨O⟩-COO-⟨O⟩-$OC_6H_{13}$ | P-n-hexyloxyphenyl-P'-n-amylbenzoate | 17 wt. % |
| $C_5H_{11}O$-⟨O⟩-COO-⟨O⟩-$OC_8H_{17}$ | P-n-octyloxyphenyl-P'-n-amyloxybenzoate | 7 wt. % | said composition having a melting point below −4° C and a clearing point above 53.5° C.

5. A nematic liquid crystal composition of net positive dielectric anisotropy having a wide temperature range of operation and suitable for use in display cells wherein said composition consists essentially, apart from minor impurities, of

| Structure | Name | Amount |
|---|---|---|
| $C_4H_9$-⟨O⟩-COO-⟨O⟩-CN | P-cyanophenyl-P'-n-butylbenzoate | 10 wt. % |
| $C_5H_{11}$-⟨O⟩-COO-⟨O⟩-CN | P-cyanophenyl-P'-n-amylbenzoate | 14 wt. % |
| $C_7H_{15}$-⟨O⟩-COO-⟨O⟩-CN | P-cyanophenyl-P'-n-heptylbenzoate | 22 wt. % |
| $C_8H_{17}$-⟨O⟩-COO-⟨O⟩-CN | P-cyanophenyl-P'-n-octylbenzoate | 24 wt. % |
| $C_5H_{11}$-⟨O⟩-COO-⟨O⟩-$OC_6H_{13}$ | P-n-hexyloxyphenyl-P'-n-amylbenzoate | 10 wt. % |
| $C_6H_{13}O$-⟨O⟩-COO-⟨O⟩-$C_7H_{15}$ | P-n-heptylphenyl-P'-n-hexyloxybenzoate | 10 wt. % |
| $C_6H_{13}O$-⟨O⟩-COO-⟨O⟩-$OC_8H_{17}$ | P-n-octyloxyphenyl-P'-n-hexyloxybenzoate | 10 wt. % | said composition having a melting point below −6° C and a clearing point above 57° C.

6. A nematic liquid crystal composition suitable for use in a display cell, wherein said composition consists essentially of, apart from minor impurities:

| Structure | Name | Amount |
|---|---|---|
| $C_7H_{15}$-⟨O⟩-⟨O⟩-CN | P-n-heptyl-P'-cyanobiphenyl | 10 wt. % |
| $C_5H_{11}$-⟨O⟩-COO-⟨O⟩-CN | P-cyanophenyl-P'-n-amylbenzoate | 14 wt. % |
| $C_7H_{15}$-⟨O⟩-COO-⟨O⟩-CN | P-cyanophenyl-P'-n-heptylbenzoate | 22 wt. % |
| $C_8H_{17}$-⟨O⟩-COO-⟨O⟩-CN | P-cyanophenyl-P'-n-octylbenzoate | 24 wt. % |
| $C_5H_{11}$-⟨O⟩-COO-⟨O⟩-$OC_6H_{13}$ | P-n-hexyloxyphenyl-P'-n-amylbenzoate | 10 wt. % |
| $C_6H_{13}O$-⟨O⟩-COO-⟨O⟩-$C_7H_{15}$ | P-n-heptylphenyl-P'-n-hexyloxybenzoate | 10 wt. % |
| $C_6H_{13}O$-⟨O⟩-COO-⟨O⟩-$OC_8H_{17}$ | P-n-octyloxyphenyl-P'-n-hexyloxybenzoate | 10 wt. % | said composition having a melting point below −7° C and a clearing point above 56° C.

7. A nematic liquid crystal composition suitable for use in a display cell, wherein said composition consists essentially of, apart from minor impurities:

| | | |
|---|---|---|
| $C_4H_9$—⟨O⟩—COO—⟨O⟩—CN | P-cyanophenyl-P'-n-butylbenzoate | 9.90 wt. % |
| $C_5H_{11}$—⟨O⟩—COO—⟨O⟩—CN | P-cyanophenyl-P'-n-amylbenzoate | 13.86 wt. % |
| $C_7H_{15}$—⟨O⟩—COO—⟨O⟩—CN | P-cyanophenyl-P'-n-heptylbenzoate | 21.78 wt. % |
| $C_8H_{17}$—⟨O⟩—COO—⟨O⟩—CN | P-cyanophenyl-P'-n-octylbenzoate | 23.76 wt. % |
| $C_5H_{11}$—⟨O⟩—COO—⟨O⟩—$OC_6H_{13}$ | P-n-hexyloxyphenyl-P'-n-amylbenzoate | 9.90 wt. % |
| $C_6H_{13}O$—⟨O⟩—COO—⟨O⟩—$C_7H_{15}$ | P-n-heptylphenyl-P'-n-hexyloxybenzoate | 9.90 wt. % |
| $C_6H_{13}O$—⟨O⟩—COO—⟨O⟩—$OC_8H_{17}$ | P-n-octyloxyphenyl n-hexyloxybenzoate | 9.90 wt. % |
| $CH_3O$—⟨O⟩—OH | P-methoxyphenol | .99 wt. % |

8. An improvement in a timepiece including a display device including an electro-optical liquid crystal display cell and electronic circuitry for timekeeping and activating said display device, wherein said improvement comprises the composition of claim 1 in said cell.

* * * * *